United States Patent
Osborne et al.

(10) Patent No.: US 7,588,618 B2
(45) Date of Patent: Sep. 15, 2009

(54) FILTER CASSETTE RACK

(75) Inventors: Mike Osborne, Louisville, KY (US); Keiron O'Connell, Louisville, KY (US); Husheder P. Daruwalla, Dunwoody, GA (US); Joachim Horst Wenzek, Amstelveen (NL); Ng Cheah Wei, Selangor (MY)

(73) Assignee: AAF-McQuay Inc., Louisville, KY (US)

( * ) Notice: Subject to any disclaimer, the term of this patent is extended or adjusted under 35 U.S.C. 154(b) by 502 days.

(21) Appl. No.: 11/336,073

(22) Filed: Jan. 20, 2006

(65) Prior Publication Data
US 2007/0169447 A1 Jul. 26, 2007

(51) Int. Cl.
*B01D 46/00* (2006.01)

(52) U.S. Cl. .............................. 55/481; 55/482; 55/484; 55/502; 55/506

(58) Field of Classification Search ........... 55/481–484, 55/493, 502, 506, 511; 277/918; 312/265.1–265.4, 312/223.1, 296
See application file for complete search history.

(56) References Cited

U.S. PATENT DOCUMENTS

| | | | |
|---|---|---|---|
| 2,762,660 A | 9/1956 | Bullock | |
| 3,434,269 A | 3/1969 | Hyatt | |
| 5,344,228 A | 9/1994 | Kovarik et al. | |
| 5,707,001 A | 1/1998 | Mark et al. | |
| 5,788,729 A * | 8/1998 | Jurgensmeyer | ............... 55/496 |
| 6,099,612 A | 8/2000 | Bartos | |
| 6,264,713 B1 | 7/2001 | Lewis, II | |
| 6,322,178 B1 | 11/2001 | Dominique | |
| 6,378,963 B1 | 4/2002 | Relyea et al. | |
| 6,848,760 B2 | 2/2005 | Thomas et al. | |
| 2004/0194441 A1* | 10/2004 | Kirsch | ............... 55/497 |

FOREIGN PATENT DOCUMENTS

| | | |
|---|---|---|
| DE | 2531708 A1 | 2/1977 |
| EP | 0900585 A1 | 8/1998 |

* cited by examiner

*Primary Examiner*—Duane Smith
*Assistant Examiner*—Dung Bui
(74) *Attorney, Agent, or Firm*—John F. Salazar; Middleton Reutlinger

(57) ABSTRACT

A filter cassette rack and tracks wherein the rack is a three dimensional rectangular rack having at least two opposing open sides, sealing and non-sealing support tracks span the rack providing filter cassette guides and sealing means for a plurality of filter cassettes.

24 Claims, 10 Drawing Sheets

FILTER CASSETTE RACK

STATEMENT REGARDING FEDERALLY SPONSORED RESEARCH OR DEVELOPMENT

Not applicable.

FIELD OF INVENTION

The present invention relates to filters, such as gas or air filters, utilizing a solid filtration media contained in a cassette wherein at least one cassette is placed in a rack having tracks to removeably receive and hold the cassette(s) in a gas stream for filtering.

BACKGROUND OF THE INVENTION

It is known in the filtration arts to provide solid filtration media for gas or air filtration. Media used in the filtration of gases are typically in the form of pellets confined in a container forming a filtration bed through which the gas stream to be filtered is passed. Filtration of selected components in the gas stream may be accomplished by several different mechanisms such as by adsorption, absorption, and/or reaction with the filtration media.

The means to contact the gas stream with the filtration media typically involves placing the filtration media in a container to form a bed of filtration media through which a gas stream is passed. These containers typically are in the form of a cassette that is removeably placed in one or more racks in a housing. Cassettes typically hold the media in between walls having perforations or slots forming a bed of media when filled and have side walls or other structural features forming a cassette that is insertable into a rack.

Typical racks have tracks that allow for the insertion, retention, and removal of the cassettes within a gas stream. However, many of these racks and/or tracks have failed to provide an efficient and reliable method of insertion, retention and/or removal of the cassette within the gas stream. Often times a seal is failed to be maintained between cassettes and/or the sides of the rack permitting blow by of gases to be filtered, consequently reducing the efficiency of filtration. Additionally, many of these racks fail to provide tracks that allow for easy insertion and removal of the cassettes.

SUMMARY OF THE INVENTION

The filter cassette racks and associated tracks of the present invention provides a cassette housing for holding filtration cassettes within a gas stream. Several embodiments of cassette racks and associated tracks are disclosed herein.

One embodiment is of a horizontal flow filter cassette rack having tracks for supporting a plurality of filter cassettes. The tracks are mounted longitudinally within one or more three dimensional rectangular racks forming a housing wherein each rack is shown formed by frame members. Alternatively, selected support tracks may serve as frame members as well. Each rack has a front and two opposing sides open. The open front allows for insertion and removal of filter cassettes. The opposing sides are open to allow for the horizontal flow of a gas stream to enter and exit the filter cassettes. Another embodiment disclosed herein is of a vertical flow filter cassette rack having tracks for supporting a plurality of filter cassettes. The tracks are mounted longitudinally within one or more three dimensional rectangular racks forming a housing wherein each rack is formed by frame members. Each rack has a front, top, and bottom open. The open front allows for insertion and removal of a plurality of filter cassettes. The open top and bottom allows for the vertical flow of a gas stream to enter and exit the filter cassettes.

A variety of tracks for receiving and sealably securing a plurality of filter cassettes are also disclosed herein. Sealing, non-sealing, upper, lower and intermediate tracks are provided for both the horizontal and vertical flow filter cassette racks. Component features of the tracks such as seals, guides, slides, and fastener slots are also disclosed. Many of the tracks disclosed herein may be used in a variety of locations within a rack providing a lower, upper, sealing, or non-sealing support track.

Other features of the present invention will become apparent upon reviewing the following detailed description of preferred embodiments of the invention, in conjunction with the drawings and the appended claims.

BRIEF DESCRIPTION OF THE DRAWINGS

Reference to the figures discloses several embodiments of the present invention and are not to be interpreted as limiting the scope of the present invention.

DETAILED DESCRIPTION OF THE PREFERRED EMBODIMENTS

The following detailed description is given primarily for clearness of understanding and no unnecessary limitations are to be understood there from and modifications will become obvious to those skilled in the art upon reading the disclosure and may be made without departing from the spirit of the invention and scope of the appended claims.

Figure 1:
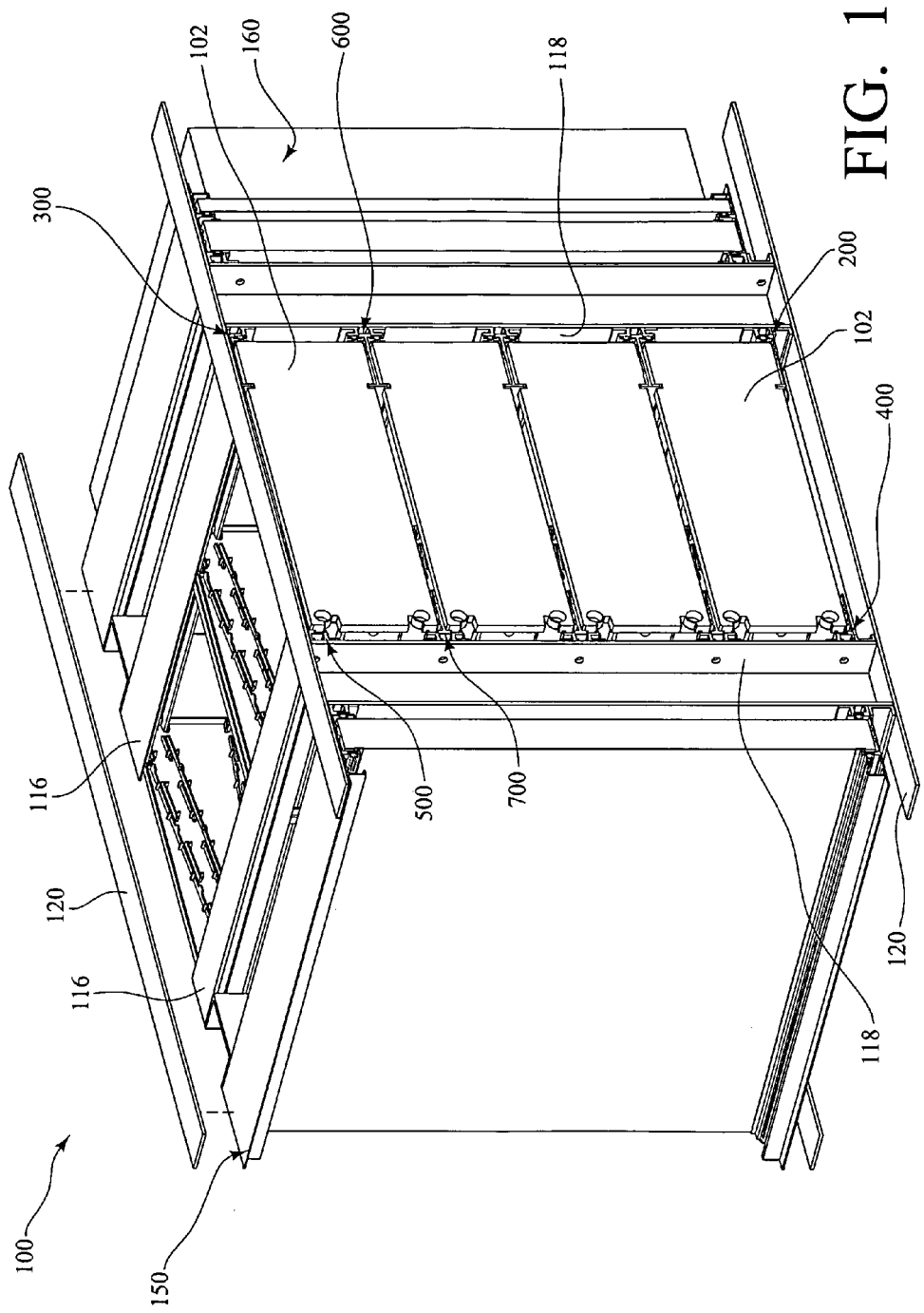
FIG. 1 is a perspective view of an embodiment of the filter cassette rack of the present invention showing a configuration for placement of cassettes within a horizontal gas flow stream.

FIG. 1 shows horizontal flow filter cassette housing 100 having a three dimensional rectangular rack formed by frame members 116, 118, and 120. Alternatively, selected support tracks could serve as frame members. The rack has a front and two opposing sides open. The open front allows access to filter cassettes 102 for insertion and removal. The opposing sides are open to allow for the horizontal flow of a gas stream to enter and exit filter cassettes 102. The top is shown open to show the orientation of filter cassette 102 within filter cassette housing 100, but will be closed to prevent the escape of the gas stream being filtered. A prefilter assembly 150 and/or postfilter assembly 160 optionally join the open opposing sides of the rectangular rack.

Within the rectangular rack are at least four horizontal and substantial parallel tracks, lower sealing track 200, upper sealing track 300, lower non-sealing track 400, and upper non-sealing track 500. It is to be understood that housing 100 could provide for a plurality of racks providing for the flow through of gas in parallel and/or in series through each rack. Upper and a lower sealing support tracks 200 and 300 span one of the two opposing open sides of the rack wherein upper sealing support track 300 is proximate the top of the rack and the lower sealing support track 200 is proximate the bottom of the rack. Upper and lower non-sealing support tracks 500 and 400 span the other of the two opposing open sides of the rack wherein upper non-sealing support track 500 is horizontally oriented sealing support track 300 and lower non-sealing support track 400 is horizontally oriented with lower sealing support track 200. Intermediate sealing track 600 and intermediate non-sealing track 700 are optional, the incorporation of which allows two or more cassettes 102 to be inserted into housing 100 in a vertical alignment. The lengths of tracks 200, 300, 400, 500, 600, and 700 can vary allowing for the insertion of one or more cassettes 102 in a horizontal alignment.

Figure 2:
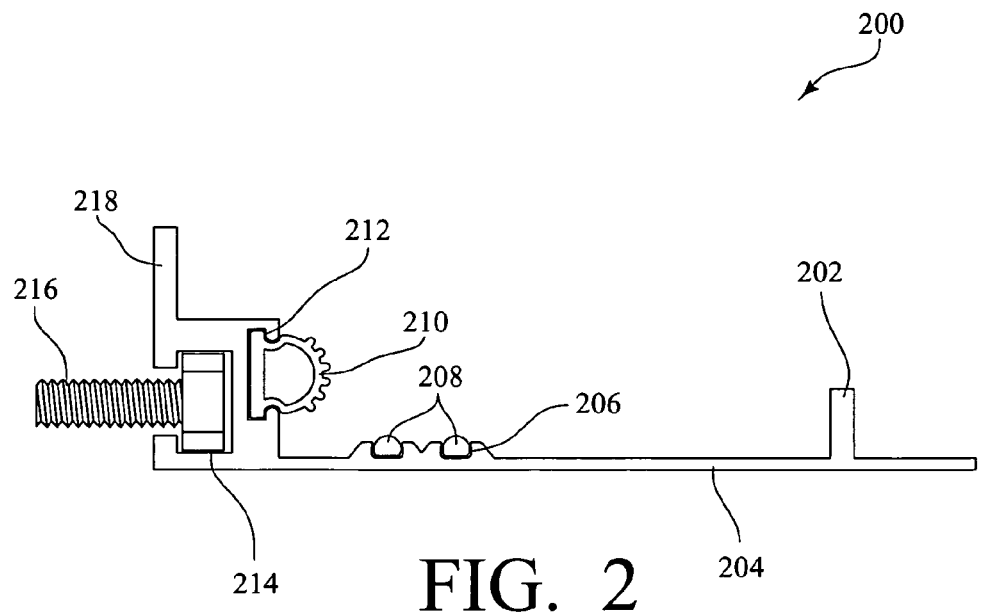
FIG. 2 is a front view of an embodiment of a lower sealing support track of the cassette rack of FIG. 1.

FIG. 2 shows lower sealing support track 200 of the embodiment of a cassette housing 100. Lower sealing support track 200 is mounted within a lower corner portion of the rectangular rack having a filter cassette engaging side on an upper side of inwardly extending cassette guide 204. Sealing support track 200 longitudinally extends with a fastener head retaining slot 214 and an oppositely opening gasket retaining slot 212 formed therein where fastener head retaining slot 214 is proximate the rack and vertically oriented with the filter cassette engaging side of cassette guide 204. The gasket retaining slot 212 is proximate and oppositely opening fastener head retaining slot 214 and vertically oriented with the filter cassette engaging side of cassette guide 204. Shown in this embodiment are two optional slide slots 206 formed in the filter cassette engaging side of cassette guide 204. Within each slide slot 206 is a cassette slide 208. Cassette slides 208 are optional and there may only be one or alternatively more than two. They provide for a reduction of friction between support track 200 and a filter cassette 102 that will slidingly engage cassette slides 208. Filter cassette retaining flange 202 vertically depends from the filter cassette engaging side of cassette guide 204 proximate an edge opposite fastener head retaining slot 214. Filter cassette retaining flange 202 engages a slot in filter cassette 102 holding a sealing surface of filter cassette 102 against gasket 210. Also shown here is fastener 216 having a head in fastener head retaining slot 214 for mounting in housing 100. Stabilizing flange 218 extends up from fastener head retaining slot 214 providing a more stable mount within housing 100.

Figure 3:
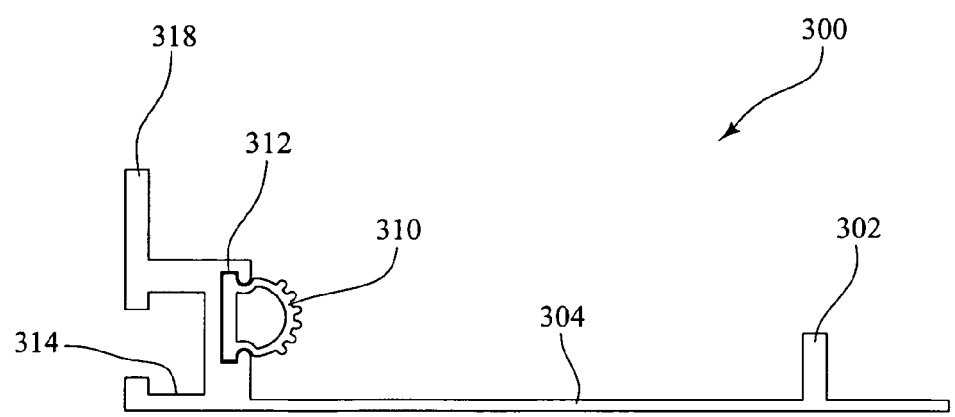
FIG. 3 is a front view of an embodiment of an upper sealing support track of the cassette rack of FIG. 1.

FIG. 3 shows an embodiment of an upper sealing support track 300 of the cassette housing 100. Upper sealing support track 300 is mounted in an upper corner portion of the rectangular rack having a filter cassette engaging side on a lower side of inwardly extending cassette guide 304. Sealing support track 300 longitudinally extends with a fastener head retaining slot 314 and an oppositely opening gasket retaining slot 312 formed therein where fastener head retaining slot 314 is proximate the rack and vertically oriented with the filter cassette engaging side of cassette guide 304. The gasket retaining slot 312 is proximate and oppositely opening fastener head retaining slot 314 and vertically oriented with the filter cassette engaging side of cassette guide 304. In the embodiment shown, there are no optional slide slots formed in the filter cassette engaging side of cassette guide 304. It is to be understood that optional slide slots could be formed in cassette guide 304 allowing interchangeability with lower sealing support track 200, thus easing production and inventory requirements. Filter cassette retaining flange 302 vertically depends from the filter cassette engaging side of cassette guide 304 proximate an edge opposite fastener head retaining slot 314. Filter cassette retaining flange 302 engages a slot in filter cassette 102 holding a sealing surface of filter cassette 102 against gasket 310. Stabilizing flange 318 extends up from fastener head retaining slot 314 providing a more stable mount within housing 100.

Figure 4:
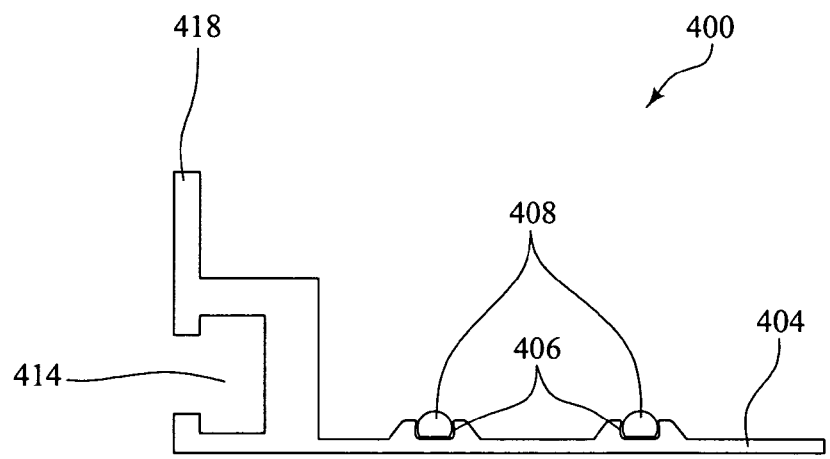
FIG. 4 is a front view of an embodiment of a lower non-sealing support track of the cassette rack of FIG. 1.

FIG. 4 shows an embodiment of lower non-sealing support track 400 of cassette housing 100. Lower non-sealing support track 400 is mounted within a lower corner portion of the rectangular rack opposite lower sealing support track 200 having a filter cassette engaging side on an upper side of inwardly extending cassette guide 404. Sealing support track 400 longitudinally extends with a fastener head retaining slot 414 proximate the rack and vertically oriented with the filter cassette engaging side of cassette guide 404. Optionally, a gasket retaining slot (not shown) may be proximate and oppositely opening fastener head retaining slot 214 allowing interchangeability. Shown in this embodiment are two optional slide slots 406 formed in the filter cassette engaging side of cassette guide 404. Within each slide slot 406 is a cassette slide 408. Cassette slides 408 are optional and there may only be one or alternatively more than two. Cassette slides 408 provide for a reduction of friction between support track 400 and a filter cassette 102 that will slidingly engage cassette slides 408. Stabilizing flange 418 extends up from fastener head retaining slot 414 providing a more stable mount within housing 100.

Figure 5:
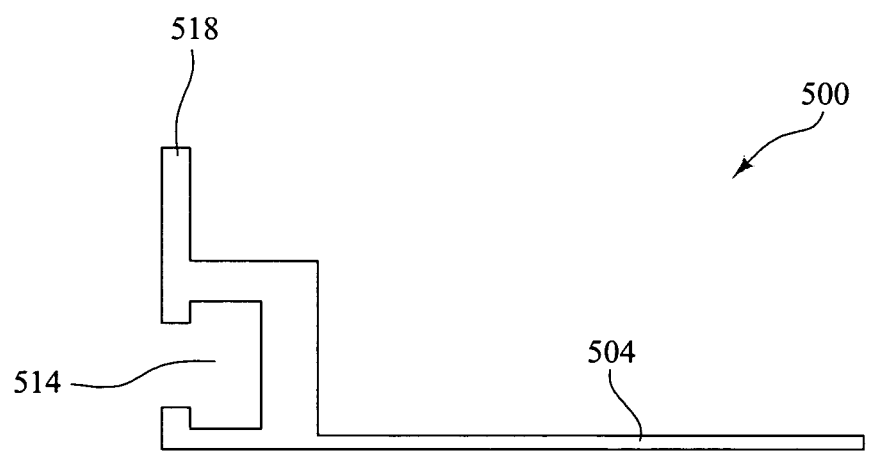
FIG. 5 is a front view of an embodiment of an upper non-sealing support track of the cassette rack of FIG. 1.

FIG. 5 shows an embodiment of upper non-sealing support track 500 of cassette housing 100. Upper non-sealing support track 500 is mounted within an upper corner portion of the rectangular rack opposite upper sealing support track 300 having a filter cassette engaging side on an upper side of inwardly extending cassette guide 504. Non-sealing support track 500 longitudinally extends with a fastener head retaining slot 514 proximate the rack and vertically oriented with the filter cassette engaging side of cassette guide 504. Optionally, a gasket retaining slot may be proximate and oppositely opening fastener head retaining slot 514 allowing interchangeability. Additionally, slide slots may be formed in the filter cassette engaging side of cassette guide 504 providing additional interchangeability with other support tracks. Stabilizing flange 518 extends up from fastener head retaining slot 514 providing a more stable mount within housing 100.

Figure 6:
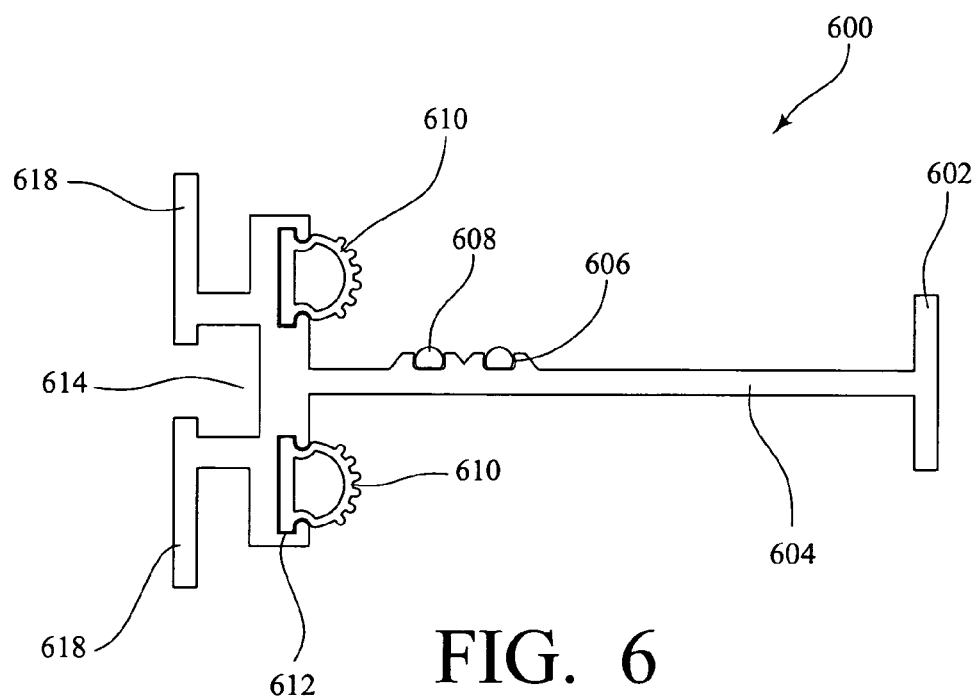
FIG. 6 is a front view of an embodiment of an intermediate sealing support track of the cassette rack of FIG. 1.

FIG. 6 shows an embodiment of intermediate sealing support track 600 of cassette housing 100. Intermediate sealing support track 600 is optional and several may be mounted to a side portion enabling filter cassette housing 100 to hold a plurality of filter cassettes in a stacked configuration as shown FIG. 1. Intermediate sealing support track 600 has inwardly extending cassette guide 604. Sealing support track 600 longitudinally extends with a fastener head retaining slot 614 and an oppositely opening gasket retaining slots 612 formed therein where fastener head retaining slot 614 is proximate the rack and centrally oriented with the filter cassette guide 604. Gasket retaining slots 612 are proximate and oppositely opening fastener head retaining slot 614 and are symmetrically vertically oriented with filter cassette guide 604. Shown in this embodiment are two optional slide slots 606 formed in an upper side of cassette guide 604. Within each slide slot 606 is a cassette slide 608 which are optional and there may only be one or alternatively more than two. They provide for a reduction of friction between support track 600 and a filter cassette 102 that will slidingly engage cassette slides 608. Filter cassette retaining flange 602 vertically depends in both directions from cassette guide 604 proximate an edge opposite fastener head retaining slot 614. Filter cassette retaining flange 602 engages a slot in an upper and lower filter cassette 102 holding a sealing surface of filter cassettes 102 against gaskets 610. Stabilizing flanges 618 extend from fastener head retaining slot 614 providing a more stable mount within housing 100.

Figure 7:
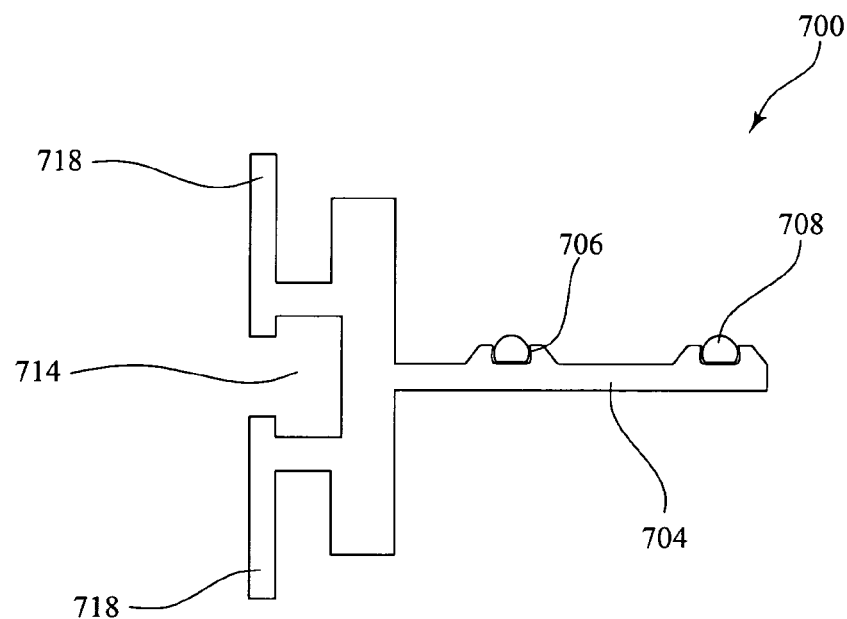
FIG. 7 is a front view of an embodiment of an intermediate non-sealing support track of the cassette rack of FIG. 1.

FIG. 7 shows an embodiment of intermediate non-sealing support track 700 of cassette housing 100. Intermediate non-sealing support track 700 is optional and several may be mounted to a side portion, each being oppositely oriented an intermediate sealing support track 600 within cassette housing 100. Intermediate non-sealing support track 700 has inwardly extending cassette guide 704. Non-sealing support track 700 longitudinally extends with a fastener head retaining slot 714 proximate the rack and centrally oriented with the filter cassette guide 704. Shown in this embodiment are two optional slide slots 706 formed in an upper side of cassette guide 704 each having a cassette slide 708. Stabilizing flanges 718 extend from fastener head retaining slot 714 providing a more stable mount within housing 100.

Figure 8:
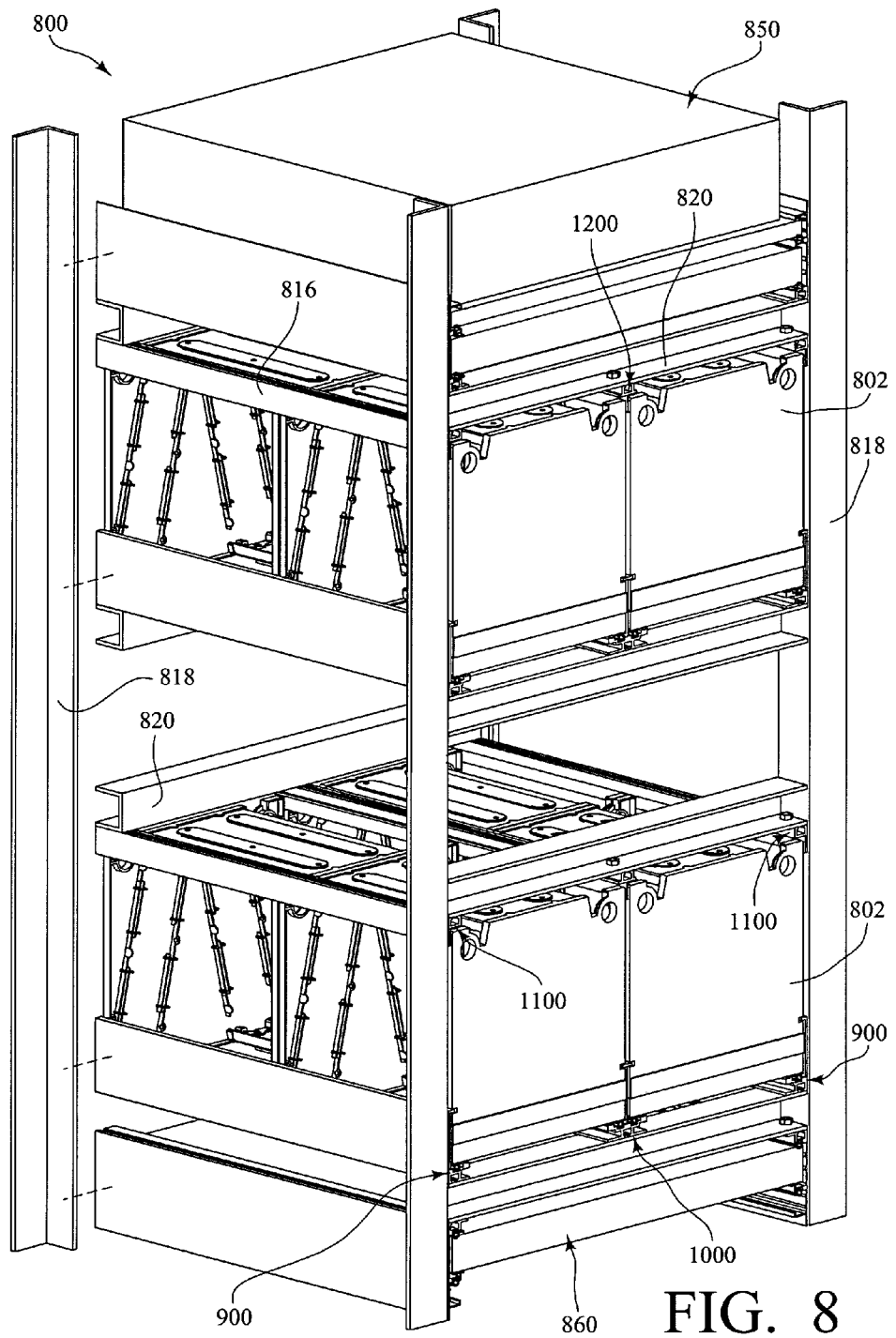
FIG. 8 is a perspective view of an embodiment of the filter cassette rack of the present invention showing a configuration for placement of cassettes within a vertical gas flow stream.

FIG. 8 shows vertical flow filter cassette housing 800 having a three dimensional rectangular rack formed by frame members 816, 818, and 820. The open front allows access to filter cassettes 802 for insertion and removal. The top and bottom are open to allow for the vertical flow of a gas stream to enter and exit filter cassettes 802. It is to be understood that housing 800 could provide for a plurality of racks providing for the flow through of gas in parallel and/or in series through each rack. Housing 800 shows two racks arrangement in series. A prefilter assembly 850 and/or postfilter assembly 860 optionally join the open top and bottom of a rectangular rack. The side is shown open to show the orientation of filter cassette 802 within filter cassette housing 800, but will be closed to prevent the escape of the gas stream being filtered.

Within the rectangular rack are at least four horizontal and substantial parallel tracks, two lower sealing tracks 900 and two upper non-sealing tracks 1100. Upper non-sealing tracks 1100 and a lower sealing support tracks 900 span two opposing sides of the rack wherein upper non-sealing support tracks 1100 are proximate the top of the rack and the lower sealing support tracks 900 are proximate the bottom of the rack. Intermediate sealing tracks 1000 and intermediate non-sealing tracks 1200 are optional, the incorporation of which allows two or more cassettes 802 to be inserted into housing 800 in a horizontal alignment. The lengths of tracks 900, 1100, 1000, and 1200 can vary allowing for the insertion of one or more cassettes 802 in a horizontal alignment.

Figure 9:
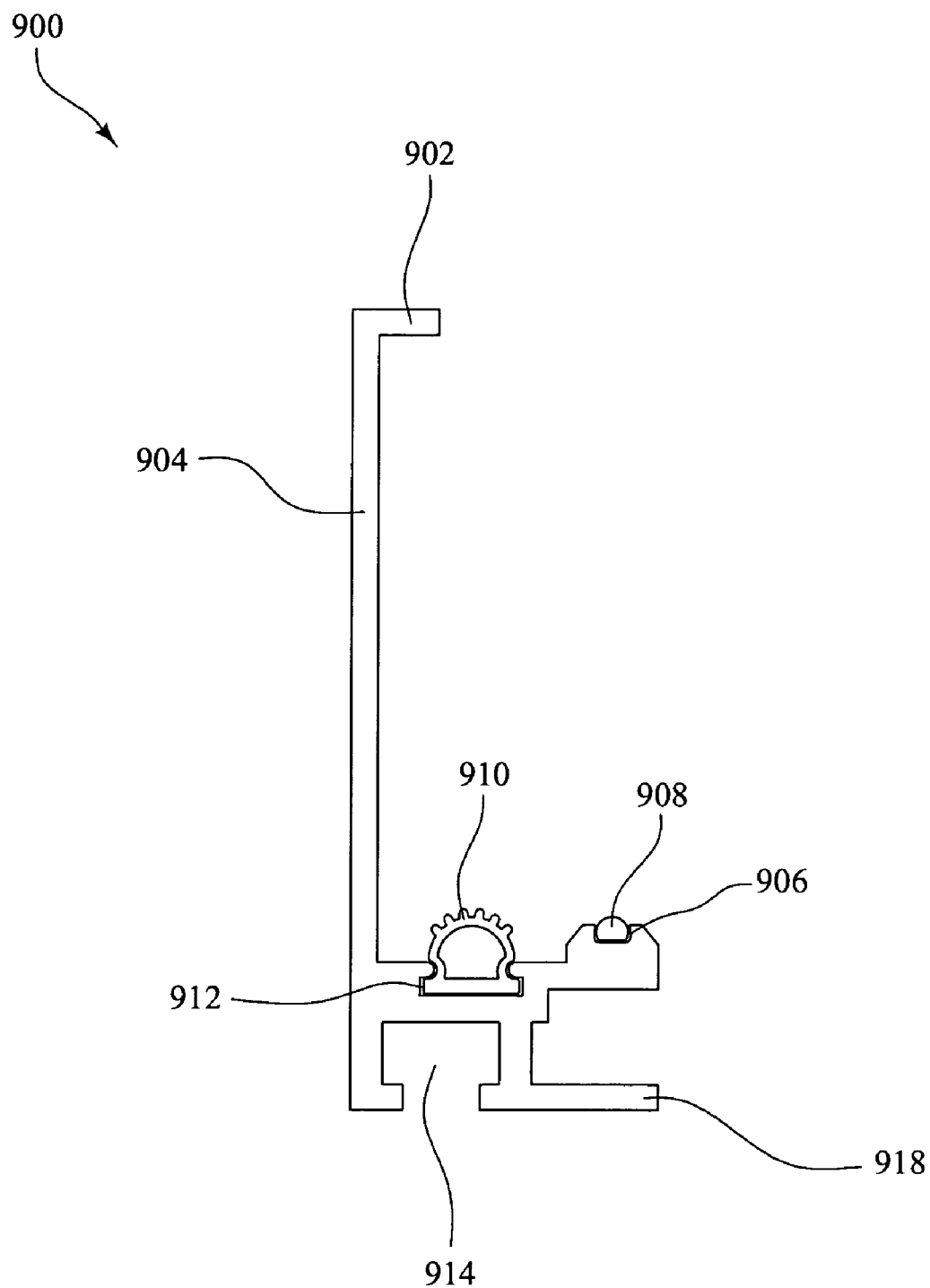
FIG. 9 is a front view of an embodiment of a lower sealing support track of the cassette rack of FIG. 8.

FIG. 9 shows an embodiment of lower sealing support track 900 of cassette housing 800. Lower sealing support track 900 is mounted within the lower corner portions of the rectangular rack having a filter cassette engaging side on an inner side of upwardly extending cassette guide 904. Sealing support track 900 longitudinally extends with a fastener head retaining slot 914 and an oppositely opening gasket retaining slot 912 formed therein where fastener head retaining slot 914 is proximate the rack. The gasket retaining slot 912 is proximate and oppositely opening fastener head retaining slot 914 and horizontally oriented with the filter cassette engaging side of cassette guide 904. Shown in this embodiment is an optional slide slot 906 formed in the filter cassette engaging side of cassette guide 904. Within slide slot 906 is a cassette slide 908. Cassette slide 908 is optional, as is slide slot 906, and there may alternatively be more than one providing for a reduction of friction between support tracks 900 and a filter cassette 802 that will slidingly engage cassette slides 908. Filter cassette retaining flange 902 horizontally depends from the filter cassette engaging side of cassette guide 904 proximate an edge opposite fastener head retaining slot 914. Filter cassette retaining flange 902 engages a slot in filter cassette 802 holding a sealing surface of filter cassette 802 against gasket 910. Stabilizing flange 818 extends out from fastener head retaining slot 914 providing a more stable mount within housing 800.

Figure 10:
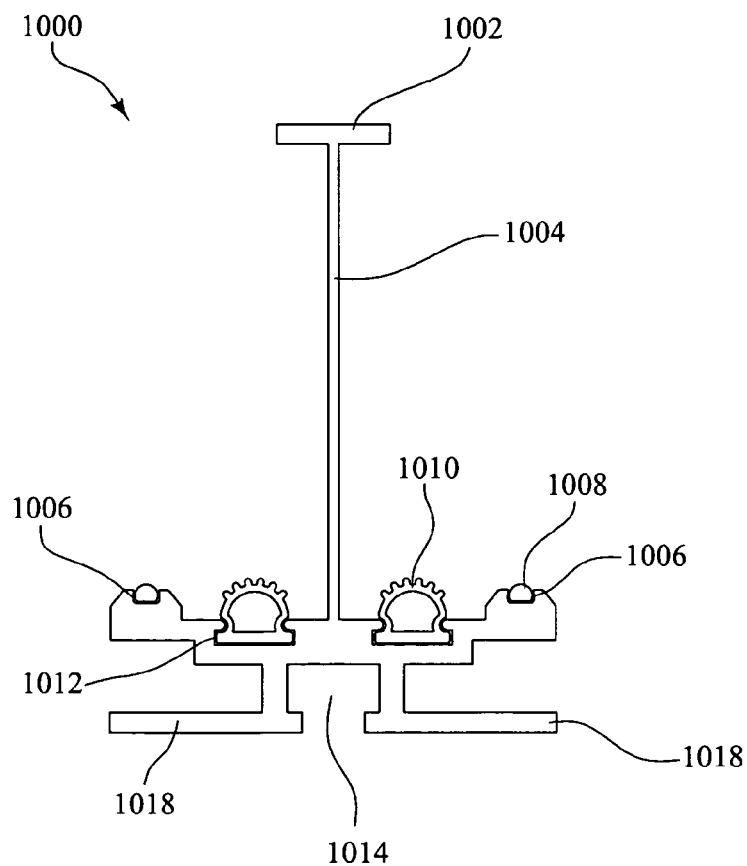
FIG. 10 is a front view of an embodiment of an intermediate sealing support track of the cassette rack of FIG. 8.

FIG. 10 shows an embodiment of an optional intermediate sealing support housing 1000 of cassette housing 800. Several intermediate sealing support tracks 1000 may be mounted to a central portion of cassette housing 800 enabling filter cassette housing 800 to hold a plurality of filter cassettes 802 in a horizontal configuration as shown FIG. 8. Intermediate sealing support housing 1000 has inwardly extending cassette guide 1004 and longitudinally extends with a fastener head retaining slot 1014 and oppositely opening gasket retaining slots 1012 formed therein. Fastener head retaining slot 1014 is proximate the rack and centrally oriented with filter cassette guide 1004. Gasket retaining slots 1012 are proximate and oppositely opening fastener head retaining slot 1014 and are symmetrically horizontally oriented with filter cassette guide 1004. Shown in this embodiment are two optional slide slots 1006, one proximate each gasket retaining slot 1006. Within each slide slot 1006 is an optional cassette slide 1008. There may be a plurality of slide slots 1006 and slides 1008 proximate each gasket retaining slot 1006. Filter cassette retaining flange 1002 horizontally depends in both directions from cassette guide 1004 proximate an edge opposite fastener head retaining slot 1014. Filter cassette retaining flange 1002 engages a slot in adjacent filter cassettes 802 holding a sealing surface of filter cassettes 802 against gaskets 1010. Stabilizing flanges 1018 extend from fastener head retaining slot 1014 providing a more stable mount within housing 800.

Figure 11:
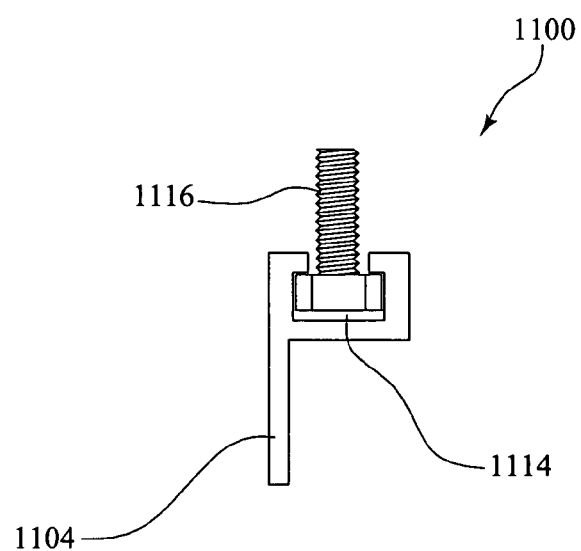
FIG. 11 is a front view of an embodiment of an upper non-sealing support track of the cassette rack of FIG. 8.

FIG. 11 shows an embodiment of upper non-sealing support track 1100 of cassette housing 800. Upper non-sealing support track 1100 is mounted within each upper corner portion of the rectangular rack above each lower non-sealing support track 900 having a filter cassette engaging side on an inner side of downwardly extending cassette guide 1104. Non-sealing support track 1100 longitudinally extends with a fastener head retaining slot 1114 proximate the rack and vertically oriented with the filter cassette engaging side of cassette guide 1104. Optionally, a gasket retaining slot may be proximate and oppositely opening fastener head retaining slot 1114 allowing interchangeability. Additionally, slide slots may be formed in the filter cassette engaging side of cassette guide 1104 providing additional interchangeability with other support tracks. Also shown here is fastener 1116 having a head in fastener head retaining slot 1114 for mounting in housing 800.

Figure 12:
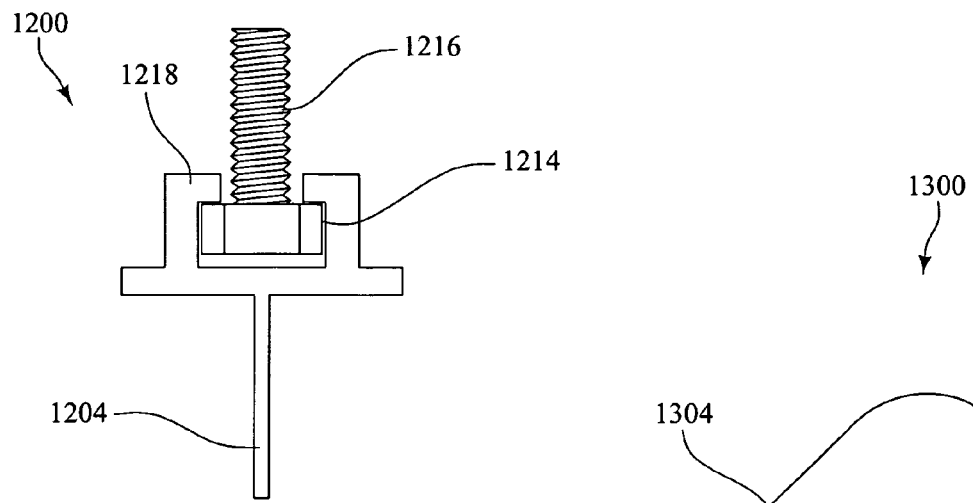
FIG. 12 is a front view of an embodiment of an intermediate non-sealing support track of the cassette rack of FIG. 8.

FIG. 12 shows an embodiment of intermediate non-sealing support track 1200 of the cassette housing 800. Intermediate non-sealing support track 1200 is optional and several may be mounted to a lower portion of cassette housing 800, each being oppositely oriented an intermediate sealing support track 1200 within cassette housing 800. Intermediate non-sealing support track 1200 has downwardly extending cassette guide 1204. Non-sealing support track 1200 longitudinally extends with a fastener head retaining slot 1214 proximate the rack and centrally oriented with the filter cassette guide 1204. Stabilizing flanges 1218 extend from fastener head retaining slot 714 providing a more stable mount of cassettes 800 within housing 100. Also shown here is fastener 1216 having a head in fastener head retaining slot 1214 for mounting in housing 800.

Figure 13:
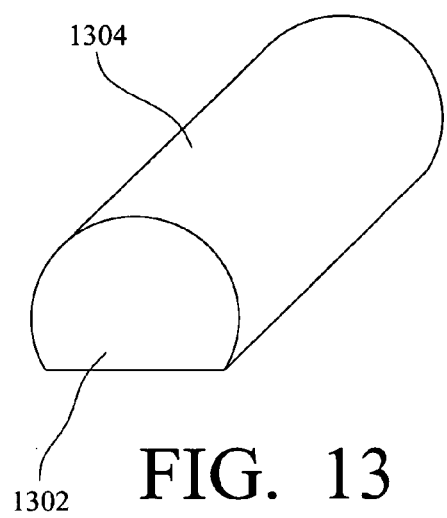
FIG. 13 is a perspective view of an embodiment of a friction reduction slide that is an optional component part of a support track.

FIG. 13 is a perspective view of an embodiment of friction reduction slide 1300 that is an optional component part of a support track. Friction reduction slides 1300 are comprised of a non-sticking, friction reducing material such as nylon, Teflon™, or other polymeric material that is nonreactive with the gas being filtered. Many of the embodiments of support tracks shown have slide slots for optionally retaining slide 1113. Slide 13 longitudinally extends within a slide slot having a lower portion 1302 mounted within a slide slot and a sliding surface 1304 slidingly engaging a filter cassette. The embodiment of a slide shown here is partially cylindrical in configuration having a substantially flat mounting surface.

Figure 14:
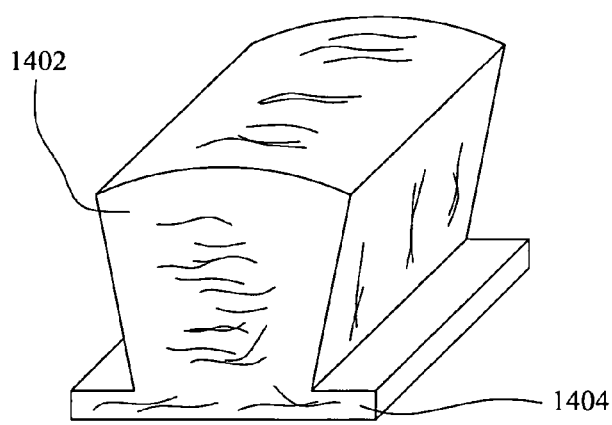
FIG. 14 is a perspective view of an embodiment of a seal that is an optional component part a of support track.

FIG. 14 shows seal 1400 that is an optional component part a of a support track. Seal 1400 is a pile seal comprised of a cloth like material and is advantageously incorporated into each sealing track. Seal 1400 has a base 1404 for mounting within a gasket retaining slot and depending sealing material 1402 which engages a sealing surface of a filter cassette when inserted into a filter cassette rack.

Figure 15:
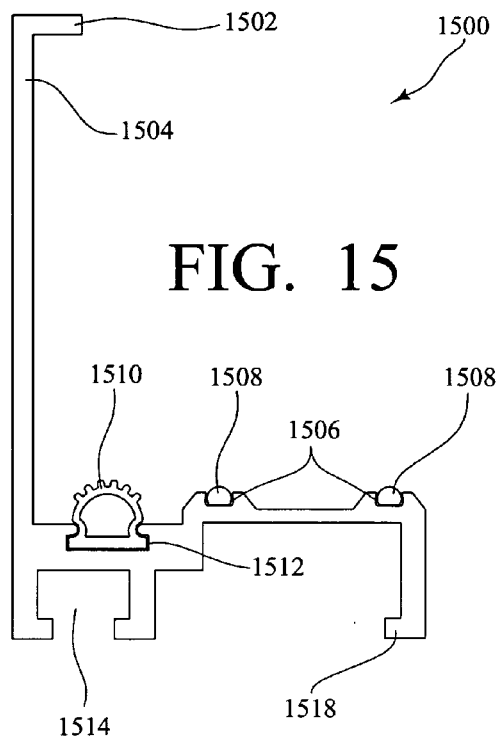
FIG. 15 is a front view of an alternative embodiment of a lower sealing support track.

FIG. 15 shows an alternative embodiment of lower sealing support track 1500 of cassette housing 800. Lower sealing support track 1500 is mounted within the lower corner portions of the rectangular rack having a filter cassette engaging side on an inner side of upwardly extending cassette guide 1504. Sealing support track 1500 longitudinally extends with a fastener head retaining slot 1514 and an oppositely opening gasket retaining slot 1512 formed therein where fastener head retaining slot 1514 is proximate the rack. The gasket retaining slot 1512 is proximate and oppositely opening fastener head retaining slot 1514 and horizontally oriented with the filter cassette engaging side of cassette guide 1504. Shown in this embodiment are two slide slots 1506 formed in the filter cassette engaging side of cassette guide 1504. Such a configuration enables sealing support track 1500 to support a large filter cassette 800. Within slide slot 1506 is a cassette slide 1508. Filter cassette retaining flange 1502 horizontally depends from the filter cassette engaging side of cassette guide 1504 proximate an edge opposite fastener head retaining slot 1514. Filter cassette retaining flange 1502 engages a slot in filter cassette 802 holding a sealing surface of filter cassette 802 against gasket 1510. Stabilizing flange 1518 extends downward from slide slots 1506 providing a more stable mount within housing 800.

Figure 16:
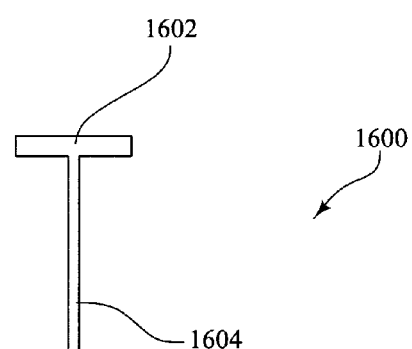
FIG. 16 is a front view of an alternative embodiment of an intermediate sealing support track.
Figure 16:
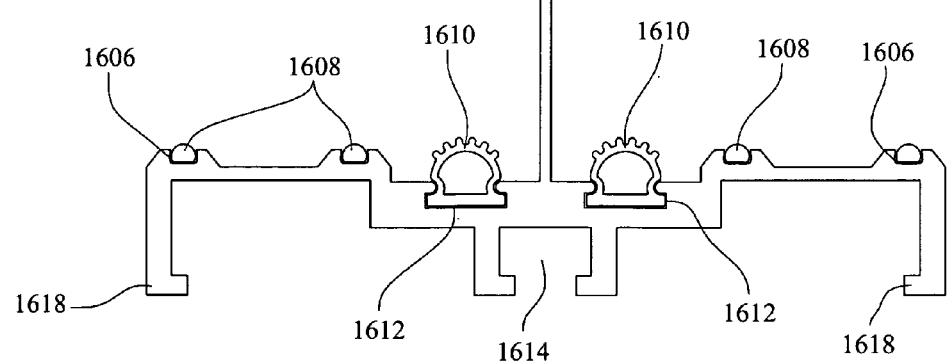

FIG. 16 shows an alternative embodiment of an optional intermediate sealing support track 1600 of cassette housing 800. Several intermediate sealing support tracks 1600 may be mounted to a central portion of cassette housing 800 enabling filter cassette housing 800 to hold a plurality of filter cassettes 802 in a horizontal configuration as shown FIG. 8. Intermediate sealing support track 1600 has inwardly extending cassette guide 1604 and longitudinally extends with a fastener head retaining slot 1614 and oppositely opening gasket retaining slots 1612 formed therein. Fastener head retaining slot 1614 is proximate the rack and centrally oriented with filter cassette guide 1604. Gasket retaining slots 1612 are proximate and oppositely opening fastener head retaining slot 1614 and are symmetrically horizontally oriented with filter cassette guide 1604. Shown in this embodiment are four optional slide slots 1606, two proximate each gasket retaining slot 1606. Within each slide slot 1606 is an optional cassette slide 1608. This configuration provides a larger sliding surface enabling intermediate sealing support track 1600 to provide support for a larger filter cassette 802. Filter cassette retaining flange 1602 horizontally depends in both directions from cassette guide 1604 proximate an edge opposite fastener head retaining slot 1614. Filter cassette retaining flange 1602 engages a slot in adjacent filter cassettes 802 holding a sealing surface of filter cassettes 802 against gaskets 1610. Stabilizing flanges 1618 extend downward from outer slide slots 1606 providing a more stable mount of a larger cassette within housing 800.

Figure 17:
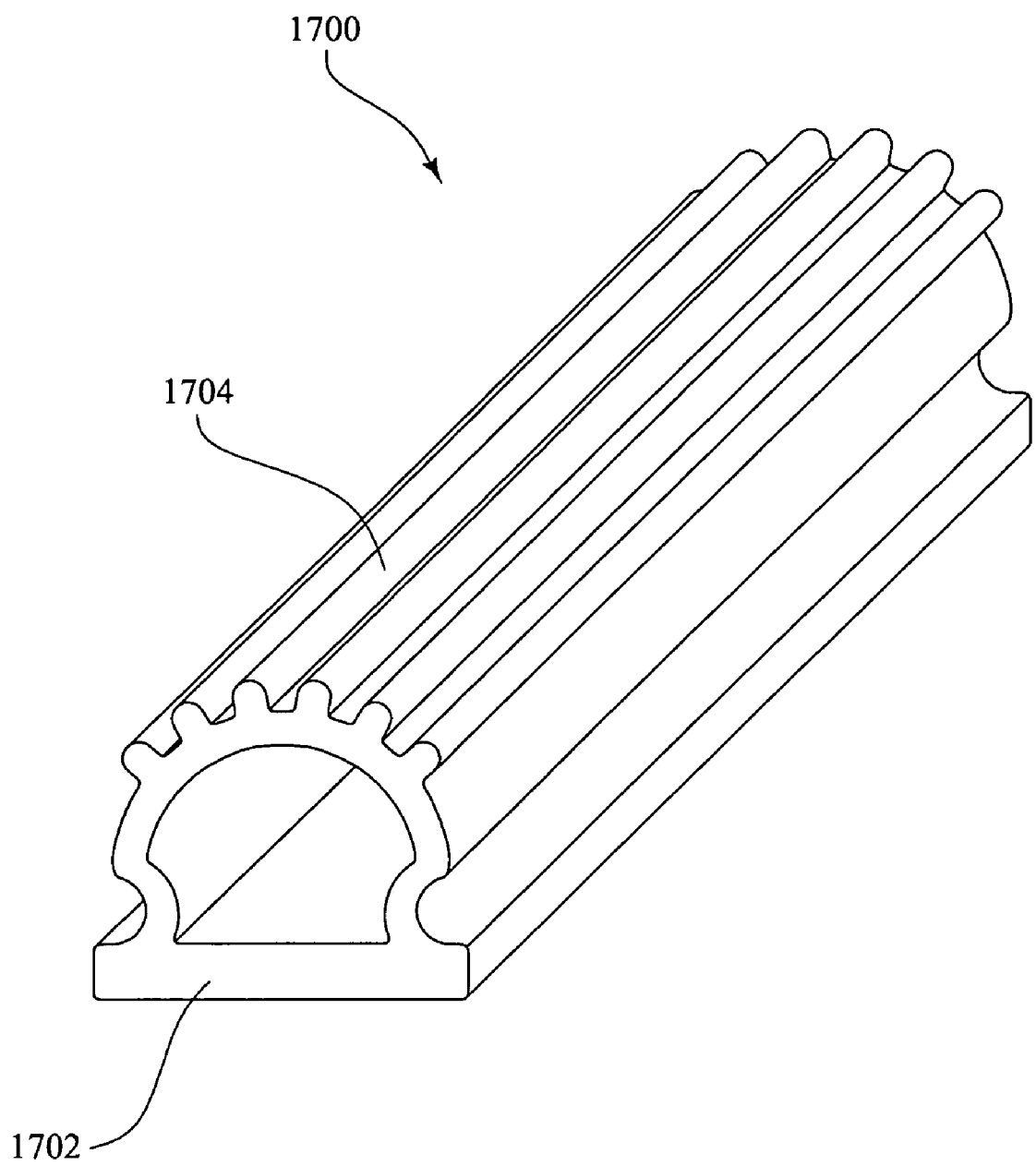
FIG. 17 is a perspective view of an embodiment of a gasket that is an alternative optional component part a of support track.

FIG. 17 shows an embodiment of a gasket that is an alternative to seal 1400 as a component part a of a sealing support track. Gasket 1700 is a longitudinally extending hollow core extrusion gasket comprised of a rubber like material and may be incorporated into each sealing track. Gasket 1700 has a base 1702 for mounting within a gasket retaining slot and sealing ribs 1704 formed in a sealing surface which engage a sealing surface of a filter cassette when inserted into a filter cassette rack.

The novel filter cassette racks and associated tracks of the instant invention provides a cassette housing for holding filtration cassettes in a variety of configurations within a gas stream. Horizontal and a vertical flow filter cassette racks having a variety of novel tracks for supporting a plurality of filter cassettes. Open fronts allows for easy insertion and removal of filter cassettes. A variety of tracks for receiving and sealably securing a plurality of filter cassettes in a variety of configurations are also disclosed herein. Many of these tracks are interchangeable with one another. Novel component features of the tracks such as seals, guides, slides, and fastener slots are also disclosed herein.

We claim:

1. A horizontal flow filter cassette rack comprising:
a three dimensional rectangular rack wherein at least a front and two opposing sides are open;
an upper and a lower sealing support track spanning one of said two opposing sides of said rack wherein said upper sealing support track is proximate the top of said rack and said lower sealing support track is proximate the bottom of said rack; and
an upper and a lower non-sealing support track spanning the other of said two opposing sides of said rack wherein said upper non-sealing support track is horizontally oriented with said sealing support track and said lower non-sealing support track is horizontally oriented with said lower sealing support track;
wherein said upper sealing support track is mounted within said rack having a filter cassette engaging side on an inwardly extending cassette guide, said sealing support track is longitudinally extending with a fastener head retaining slot and an oppositely opening gasket retaining slot formed therein where said fastener head retaining slot is proximate said rack and vertically oriented with said filter cassette engaging side of said cassette guide and said gasket retaining slot is proximate said fastener head retaining slot and vertically oriented with said filter cassette engaging side of said cassette guide, and a filter cassette retaining flange vertically depending from said filter cassette engaging side of said cassette guide proximate an edge opposite said fastener head retaining slot.

2. The horizontal flow filter cassette rack of claim 1 wherein said lower sealing support track is mounted within said rack having a filter cassette engaging side on an inwardly extending cassette guide, said sealing support track is longitudinally extending with a fastener head retaining slot and an oppositely opening gasket retaining slot formed therein where said fastener head retaining slot is proximate said rack and vertically oriented with said filter cassette engaging side of said cassette guide and said gasket retaining slot is proximate said fastener head retaining slot and vertically oriented with said filter cassette engaging side of said cassette guide, and a filter cassette retaining flange vertically depending from said filter cassette engaging side of said cassette guide proximate an edge opposite said fastener head retaining slot.

3. The horizontal flow filter cassette rack of claim 1 wherein said lower non-sealing support track is mounted within said rack having an inwardly extending cassette guide, said non-sealing support track has a fastener head retaining slot proximate said rack and vertically oriented with a filter cassette engaging side of said cassette guide.

4. The horizontal flow filter cassette rack of claim 1 wherein said upper non-sealing support track is mounted within said rack having an inwardly extending cassette guide, said non-sealing support track has a fastener head retaining slot proximate said rack and vertically oriented with a filter cassette engaging side of said cassette guide.

5. A horizontal flow filter cassette rack comprising:
  a three dimensional rectangular rack wherein at least a front and two opposing sides are open;
  an upper and a lower sealing support track spanning one of said two opposing sides of said rack wherein said upper sealing support track is proximate the top of said rack and said lower sealing support track is proximate the bottom of said rack; and
  an upper and a lower non-sealing support track spanning the other of said two opposing sides of said rack wherein said upper non-sealing support track is horizontally oriented with said sealing support track and said lower non-sealing support track is horizontally oriented with said lower sealing support track
  wherein said upper and said lower sealing support tracks have at least one intermediate sealing support track mounted therebetween, said at least one intermediate sealing support track is mounted within said rack having an upper and a lower filter cassette engaging side on an inwardly extending cassette guide and a filter cassette retaining flange vertically depending in both directions from said cassette guide proximate an edge opposite said fastener head retaining slot.

6. The horizontal flow filter cassette rack of claim 5 wherein said upper and said lower non-sealing support tracks have at least one intermediate non-sealing support track mounted therebetween, an intermediate sealing support track is mounted within said rack opposite each of said intermediate sealing support tracks, each of said intermediate non-sealing support tracks has an inwardly extending cassette guide substantially opposite each inwardly extending cassette guide of each of said intermediate sealing support tracks.

7. The horizontal flow filter cassette rack of claim 1 wherein said upper and said lower sealing support tracks have sealing member in each gasket retaining slot.

8. The horizontal flow filter cassette rack of claim 7 wherein said sealing member is a pile seal.

9. The horizontal flow filter cassette rack of claim 7 wherein said sealing member is a hollow core extrusion gasket.

10. The horizontal flow filter cassette rack of claim 5 wherein said intermediate sealing support tracks have gasket retaining slots proximate and oppositely opening said fastener head retaining slot and symmetrically oriented with said cassette guide, each gasket retaining slot has a sealing member therein.

11. The horizontal flow filter cassette rack of claim 1 wherein said lower support tracks each have a cassette guide with a cassette engaging side and at least one slide slot longitudinally formed therein, each slide slot has a cassette slide mounted within said at least one slide slot.

12. The horizontal flow filter cassette rack of claim 11 wherein said cassette slide is partially cylindrical in configuration having a substantially flat mounting surface.

13. The horizontal flow filter cassette rack of claim 5 wherein said intermediate support tracks each have a cassette guide with a cassette engaging side and at least one slide slot longitudinally formed therein, each slide slot has a cassette slide mounted within said at least one slide slot.

14. The horizontal flow filter cassette rack of claim 6 wherein said intermediate support tracks each have a cassette guide with a cassette engaging side and at least one slide slot longitudinally formed therein, each slide slot has a cassette slide mounted within said at least one slide slot.

15. A filter cassette rack for retaining a filter cassette, comprising:
  a rectangular rack designed for receiving a filter cassette and having an upstream end and a downstream end;
  an upper sealing support track and an opposing lower sealing support track spanning across said rack wherein said upper sealing support track is proximate the top of said rack and said lower sealing support track is proximate the bottom of said rack; and
  an upper non-sealing support track and an opposing lower non-sealing support track spanning across said rack wherein said upper non-sealing support track is upstream of said sealing support track and said lower non-sealing support track is upstream of said lower sealing support track;
    wherein said lower sealing support track is mounted within said rack having a filter cassette engaging side on an inwardly extending cassette guide, said lower sealing support track having a fastener head retaining slot and an oppositely opening gasket retaining slot formed therein and a filter cassette retaining flange proximate an edge opposite said fastener head retaining slot.

16. The filter cassette rack for retaining a filter cassette of claim 15, wherein said upper sealing support track is mounted within said rack having a filter cassette engaging side on an inwardly extending cassette guide, said upper sealing support track having a fastener head retaining slot and an oppositely opening gasket retaining slot formed therein and a filter cassette retaining flange proximate an edge opposite said fastener head retaining slot.

17. The filter cassette rack for retaining a filter cassette of claim 15 wherein said lower non-sealing support track is mounted within said rack having an inwardly extending cassette guide, said non-sealing support track having a fastener head retaining slot proximate said rack and oriented with a filter cassette engaging side of said cassette guide.

18. The filter cassette rack for retaining a filter cassette of claim 15 wherein said upper non-sealing support track is mounted within said rack having an inwardly extending cassette guide, said non-sealing support track having a fastener head retaining slot proximate said rack and oriented with a filter cassette engaging side of said cassette guide.

19. The filter cassette rack for retaining a filter cassette of claim 15 wherein said upper and said lower sealing support tracks have sealing member in each gasket retaining slot.

20. The filter cassette rack for retaining a filter cassette of claim 19 wherein said sealing member is a pile seal.

21. The filter cassette rack for retaining a filter cassette of claim 19 wherein said sealing member is a hollow core extrusion gasket.

22. The filter cassette rack for retaining a filter cassette of claim 19 wherein said lower support tracks each have a cassette guide with a cassette engaging side and at least one slide slot longitudinally formed therein, each slide slot having a cassette slide mounted within said at least one slide slot.

23. The filter cassette rack for retaining a filter cassette of claim 19 wherein said lower support track each has a cassette guide extending along at least a portion of said track.

24. A filter cassette rack for retaining a filter cassette, comprising:
   a rack designed for receiving a filter cassette and having an upstream end and a downstream end;
   an upper sealing support track and an opposing lower sealing support track spanning across said rack wherein said upper sealing support track is proximate the top of said rack and said lower sealing support track is proximate the bottom of said rack;
   an upper non-sealing support track and an opposing lower non-sealing support track spanning across said rack wherein said upper non-sealing support track is upstream of said sealing support track and said lower non-sealing support track is upstream of said lower sealing support track;
   said lower sealing support track having a fastener head retaining slot and an oppositely positioned gasket and a filter cassette retaining flange proximate an edge opposite said fastener head retaining slot;
   said upper sealing support track having a fastener head retaining slot and an oppositely positioned gasket and a filter cassette retaining flange proximate an edge opposite said fastener head retaining slot;
   said lower non-sealing support track having a fastener head retaining slot proximate said rack;
   said upper non-sealing support track having a fastener head retaining slot proximate said rack;
   said upper and said lower sealing support tracks have sealing member in each gasket retaining slot.

* * * * *

UNITED STATES PATENT AND TRADEMARK OFFICE
CERTIFICATE OF CORRECTION

PATENT NO. : 7,588,618 B2 Page 1 of 1
APPLICATION NO. : 11/336073
DATED : September 15, 2009
INVENTOR(S) : Osborne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Twenty-first Day of September, 2010

David J. Kappos
*Director of the United States Patent and Trademark Office*